March 6, 1928.
C. J. SCHEN
1,661,857
UNIVERSAL THREAD GAUGE
Filed June 21, 1924    2 Sheets-Sheet 1
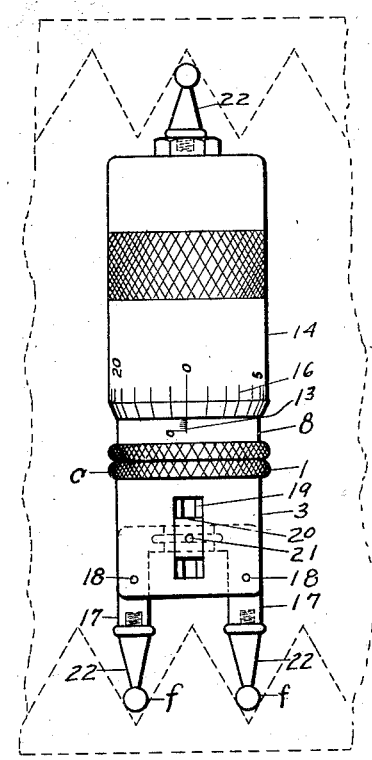

March 6, 1928.

C. J. SCHEN

UNIVERSAL THREAD GAUGE

Filed June 21, 1924

INVENTOR
Charles J. Schen

BY Myron J. Dikeman
ATTORNEY

Patented Mar. 6, 1928.

1,661,857

UNITED STATES PATENT OFFICE.

CHARLES J. SCHEN, OF DETROIT, MICHIGAN.

UNIVERSAL THREAD GAUGE.

Application filed June 21, 1924. Serial No. 721,428.

The object of my invention is to provide a universal thread gauge that is adapted for use in measuring the diameter of threaded parts for calculating the pitch diameter of the threads.

Another object is to provide a thread gauge adapted for use and adjustment in measuring various sizes and forms of threads in determining the pitch diameter of the threaded part.

A further object is to provide a thread gauge having an automatic compensating slide thereon for correcting the main micrometer reading for various size threads.

A still further object is to provide a universal thread gauge that is simple in construction, easily and efficiently operated and can be manufactured at a low cost.

These several objects are attained by the construction and arrangement of parts more fully hereinafter set forth.

Similar parts on all drawings are marked by similar numerals.

Fig. 1, shows a general view of the thread gauge and compensating means for determining the error when the gauge is adjusted to various size thread.

Fig. 2, is a side view of the gauge showing the mounting of the lower compensating levers.

Fig. 3, is a top view of the gauge.

Fig. 4, is an enlarged view of the compensating vernier. (Fig. 12 is the top view of Fig. 4.)

Fig. 5, is a detail of the extension bar for measuring pieces of larger diameter.

Fig. 6, is a detail of the thread block, changeable for various sizes of threads upon which the gauge is to be used.

Figure 7:
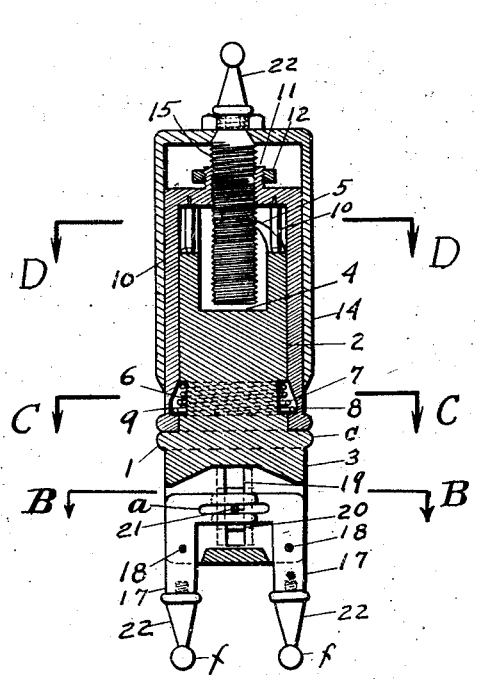
Fig. 7, is a sectional view on the line —AA— on Fig. 3, showing the general arrangement and the detailed construction of the gauge, and the interior means for extension of the gauge.
Figure 8:
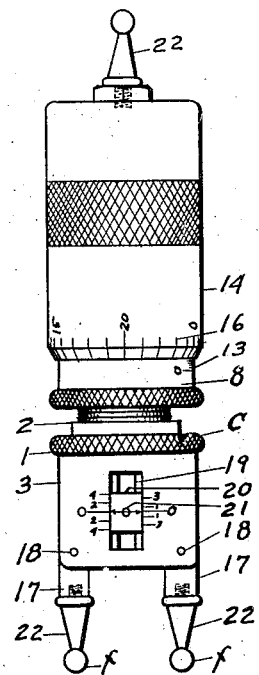
Fig. 8, shows the gauge when opened, or extended.
Figure 9:
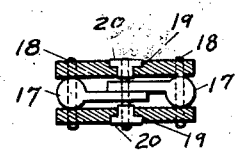
Fig. 9, is a cross section on line —BB— of Fig. 7, showing the detailed arrangement of the compensating mechanism.

I will now describe more fully the detailed construction of my universal thread gauge, referring to the drawings and the marks thereon.

The general construction of my gauge comprises a tubular body section having an outer operating micrometer sleeve rotating thereon, and so attached thereto by means of connecting threaded members, as to elongate the body of the gauge as the thimble is rotated. The micrometer sleeve carries a single thread engaging member mounted thereon, and the tubular body section is provided with double compensating thread engaging members, pivotally mounted therein, and means for adjusting, and correcting error, as the gauge members, are adjusted to various sizes of threads.

It is apparent that the gauge illustrated in the drawing is adapted for measuring diameters of internal threaded parts only, same being known as an internal thread gauge, and is used for measuring pitch diameters of threads, as illustrated in Fig. 1.

Figure 11:
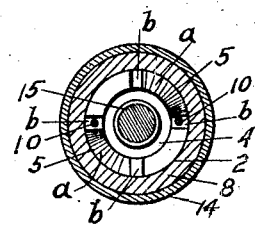
Fig. 11, is a cross section on the line —DD— of Fig. 7, showing the cam extension block for elongating the gauge frame.
Figure 10:
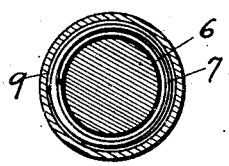
Fig. 10, is a cross section on line —CC— of Fig. 7, showing the coil spring for holding the extension member in position.

The body member —1— is made of a solid piece of metal, formed into cylindrical section —2— and rectangular shaped section —51—. The cylindrical drum —2— is formed for receiving a rotatable micrometer sleeve —8— and a slotted end frame —3— on the other end thereof for retaining the adjustable thread engaging members therein. The body drum —2— is turned to a true cylindrical shape, and is provided with a tubular recess —4— in the top end thereof for receiving the adjusting micrometer screw —15—. Along the top edge of the drum —2— are formed two extension cams —5—, same being a part of drum —2—, arranged on opposite sides of the recess —4—. The lower end of the drum section —2— is provided with an annular recess —6— for receiving and retaining a coil compression spring —7— therein. The extension cams —5— are formed of helical curved surfaces (a) having flat parallel tables (b) at each end thereof, as shown in Fig. 11, said flat tables (b) being arranged at right angles to the axis of the body drum —2—. The length of the helical cam —5— is preferably one-quarter of an inch along the axis of the drum —2—, or some multiple thereof, for simplicity in the computation of measurements, and covering an angle to allow the micrometer sleeve —8— to rotate thereon ninety degrees. Over the body of the drum —2— is fitted a hollow cylindrical micrometer sleeve —8—, having one open end therein, and free to slide or move thereon. The sleeve —8— fitting and resting on the drum collar —c—, incloses the entire drum —2— therein. Near the open end of the sleeve —8— is an internal annular groove —9— for receiving the end of the conical coil spring —7—. At the closed end of the sleeve —8— are two extensions pins —10—, fixedly attached to the inner wall thereof, and extending downward within the sleeve parallel to the axis thereof. The pins —10— are pressed in sockets in the top of sleeve —8— and are of a length to rest on the lower cam tables —b—, and are held firmly in place by the action of the coil spring —7— engaging both the drum —2— and the sleeve —8—. As the sleeve —8— is rotated ninety degrees to the left about the axis thereof, over the drum —2—, the extension pins —10— are raised by the helical cams —5—, and extend the sleeve —8— beyond the body of the drum —2—, a distance equal to the height of the cam —5—, engaging the upper cam tables —b— and held firmly thereon by the action of the spring —7—, thus increasing the capacity of the gauge. The center of the closed end of sleeve —8— is provided with a tapered threaded collar —11— and lock nut —12— for tightening said collar —11— on the inclosed screw —15—. Along the outer face of the sleeve —8—, are scale graduations —13—. Over the sleeve —8— is fitted the cylindrical micrometer thimble —14—, and rotatable thereon. The thimble —14— is closed at one end and provided with a fixedly attached center adjusting screw —15—, for engaging the threaded collar —11— of the inner sleeve —8—, and which moves the thimble —14— longitudinally on the sleeve —8— as it is rotated thereon. The edge of the open end of the thimble —14— is graduated in equal spaces —16—, and by determining the lead of the threaded screw —15— and proper graduations of —16—, very accurate measurements may be determined. In the slotted end frame —3— of the body —1—, are mounted two L-shaped compensating arms —17—, free to turn on pivots —18—, and having the inner arm slotted at the end thereof. On both the outer sides of the frame —3—, are slots —19—, carrying a movable compensating slide —20— therein. These slides —20— are connected by the pin —21—, extending across the end slot in the end frame —3—, and said pin engages the slotted ends of the arms —17— in such a manner that any movement of the arms —17— causes the slide —20— to move longitudinally in the slots —19—. The slide —20— carries graduations —b— inscribed thereon, and corresponding graduations —c— are placed along the edge of the slide groove —19—, for indicating the error allowable as the arms —17— are adjusted to engage the different sizes of threads. To the outer ends of the arms —17— are attached the blocks —22—, which are formed with a small threaded shank —e— to engage the threads in arm —17—, and carry a small ball —f— for engaging the walls of the thread, as illustrated in Fig. 1. Also a single block —22— is attached to the end of screw —15— and projecting from the closed end of the micrometer thimble —14—. The size of the balls —f— is predetermined for the different size of threads to be measured, each size being made in sets of three, and tabulated for use with the different size threads. A further adjustment is made in the gauge by use of the extension bar —23— Fig. 5, which is made in one half inch lengths, or some multiple thereof, and is attached to the gauge member in place of the thread block —22—, and then the thread block —22— screwed therein for the purpose of extending the length of the gauge body, increasing its capacity for larger work.

As the gauge is applied in measuring internal thread diameters, the movable thread engaging arms —17— swing on pivots —18—, allowing the thread ball —f— to engage two threads, as illustrated in Fig. 1. When the balls —f— are brought together, and away from their parallel or zero position, thereby shortening the total length of the gauge, causing an error in the thimble micrometer reading on scale —13—, the total error is indicated by the reading on the compensating slide —20—.

It can readily be seen that by predetermined diameters of the balls —f— for various size threads, the properly graduated compensating slide and the main graduated thimble reading, the exact pitch diameter of the threads can be determined.

Having fully described my universal thread gauge, what I claim as my invention and desire to secure by Letters Patent is:

1. An inside gauge comprising a cylindrical body, a circumferentially graduated thimble mounted thereon, means whereby said thimble may be moved longitudinally thereon, a single thread engaging member attached to the end of said thimble, and projecting therefrom, two thread engaging members pivotally attached to the body, at the opposite end, and pivot means for allowing adjustment of said two thread engaging members simultaneously to engage consecutive thread grooves.

2. An inside gauge for measuring diameters of internally threaded apertures, comprising a cylindrical body, a rotatably mounted thimble, circumferentially graduated, fitted over said body, means whereby said thimble may be moved longitudinally thereon, a single thread engaging member projecting from the end of the said thimble, two thread engaging members pivotally mounted in the body at the opposite end to the thimble, pivot means for allowing adjustment of the two thread engaging members simultaneously to threads of the machine parts to be measured, and means for indicating the error in measurement caused by said thread adjustment.

3. An inside gauge adapted for measuring diameters of internally threaded apertures, comprising a cylindrical body, a thimble circumferentially graduated mounted thereon, means whereby said thimble may be moved longitudinally thereon, a single thread engaging member projecting from the end of said thimble, two thread engaging members attached to the opposite end of the body, said two members positioned parallel with each other and parallel with the axis of the body, and projecting therefrom, a graduated compensating slide attached to said body and connected to the two thread members and slide as they are adjusted to engage threads of the machine part to be measured.

4. An inside gauge adapted for measuring diameters of internally threaded apertures, comprising a cylindrical body having one end thereof slotted, and having a thimble circumferentially graduated rotatably mounted on said cylindrical body, means whereby said thimble may be moved thereon longitudinally, a single fixed thread engaging member projecting from the end of said thimble, two thread engaging members pivoted in the slotted end of the drum body and projecting therefrom and parallel thereto, said thread engaging members being formed L-shaped and are slotted in the upper ends thereof for receiving a movable block pin, an exterior compensating slide mounted in the side of the slotted section of the body, and a block pin projecting therefrom for engaging the slotted ends of the two thread engaging members.

5. An inside gauge adapted for measuring the diameter of internally threaded apertures, comprising a cylindrical body having one end thereof slotted, an extension sleeve movably mounted thereon, means for moving said sleeve longitudinally on said body, a thimble circumferentially graduated and rotatably mounted on the extension sleeve and having a threaded adjusting member fixedly attached to the end of the thimble, a single thread engaging member projecting from the end of the thimble, two L-shaped, slotted, threaded engaging members pivoted in the slotted end of the body, extending therefrom and parallel to the axis thereof, said L-shaped members being movable on the pivots for adjusting to threads of various sizes, an exterior graduated compensating slide mounted on the body connecting the slotted ends of the two L-shaped engaging members, and means for connecting said slide thereto.

6. An inside gauge adapted to measuring diameters of internally threaded apertures, comprising a cylindrical body having one end thereof slotted and provided with helical extension cams, a cylindrical extension sleeve movably mounted on said body, pins mounted in sleeve for preventing continuous rotation thereon, cam pins fixedly attached to the interior walls of the extension sleeve, projecting therefrom to engage the helical extension cams on the body, a coil spring annularly interposed between the walls of the movable extension sleeve and the body, said coil spring engaging the walls of both members and so positioned as to hold the extension sleeve to the body shoulder, a circumferentially graduated thimble rotatably mounted on the extension sleeve and having a threaded adjusting member fixedly attached to the closed end of the thimble for engaging therewith, a ball tipped thread engaging member fixedly mounted on the end of said thimble and projecting therefrom, a pair of slotted L-shaped thread engaging members pivotally mounted in the slotted end of the body so positioned that the slotted ends thereof, overlap each other near the center of the slotted end of the body, ball tipped thread blocks attached to the ends of the L-shaped thread engaging members, a compensating slide mounted in the slotted end of the body and connecting the slotted ends of the thread engaging arms, a slide pin for attaching the slide to the movable thread members.

In witness whereof I sign these specifications.

CHARLES J. SCHEN.